United States Patent
Wu et al.

(10) Patent No.: US 9,680,369 B2
(45) Date of Patent: Jun. 13, 2017

(54) POWER FACTOR CORRECTION CIRCUIT OF POWER CONVERTER

(71) Applicant: Richtek Technology Corporation, Chupei, Hsinchu (TW)

(72) Inventors: Chang-Yu Wu, Hsinchu County (TW); Tzu-Chen Lin, Changhua County (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 276 days.

(21) Appl. No.: 14/547,870

(22) Filed: Nov. 19, 2014

(65) Prior Publication Data

US 2015/0162821 A1   Jun. 11, 2015

(30) Foreign Application Priority Data

Dec. 5, 2013 (TW) ............................ 102144716 A

(51) Int. Cl.
*H02M 1/42* (2007.01)

(52) U.S. Cl.
CPC ....... *H02M 1/4258* (2013.01); *H02M 1/4225* (2013.01); *Y02B 70/126* (2013.01); *Y02P 80/112* (2015.11)

(58) Field of Classification Search
CPC .. H02M 1/4225; H02M 1/4258; H02M 1/083; H02M 2001/0009; H02M 2001/0058
See application file for complete search history.

(56) References Cited

U.S. PATENT DOCUMENTS

| 8,508,206 B2* | 8/2013 | Wan ................... H02M 3/1588 323/283 |
| 2006/0061337 A1 | 3/2006 | Kim et al. |
| 2011/0102950 A1* | 5/2011 | Park ................... H02M 1/4225 361/18 |
| 2012/0250367 A1* | 10/2012 | Desimone ............... H02M 1/44 363/21.17 |

FOREIGN PATENT DOCUMENTS

| CN | 1753290 A | 3/2006 |
| TW | 201317734 A1 | 5/2013 |

* cited by examiner

*Primary Examiner* — Adolf Berhane
*Assistant Examiner* — Henry Lee, III
(74) *Attorney, Agent, or Firm* — Birch, Stewart, Kolasch & Birch, LLP

(57) ABSTRACT

A power factor correction (PFC) circuit of a power converter is disclosed. The power converter includes a primary side coil, a secondary side coil, an inductive coil, and a power switch. The PFC circuit includes a zero current detection circuit for detecting an inductive signal of the inductive coil to generate a detection signal; an error detection circuit for generating an error signal corresponding to an output voltage signal or an output current signal according to a reference signal; a ramp signal generating circuit for generating a ramp signal; a comparison circuit for comparing the ramp signal with the error signal to generate a comparison signal; and a trigger circuit for generating a control signal to control the power switch and for controlling the ramp signal generating circuit to adjust a slope of the ramp signal according to the detection signal and the comparison signal.

12 Claims, 5 Drawing Sheets

POWER FACTOR CORRECTION CIRCUIT OF POWER CONVERTER

CROSS-REFERENCE TO RELATED APPLICATIONS

This application claims the benefit of priority to Patent Application No. 102144716, filed in Taiwan on Dec. 5, 2013; the entirety of which is incorporated herein by reference for all purposes.

BACKGROUND

The disclosure generally relates to a power factor correction circuit and, more particularly, to a power factor correction circuit of a power converter.

The power utilization efficiency of electronic devices has become more and more important as the energy shortage problem deteriorates. The traditional power converter is typically realized by using diode rectifiers. Although such structure is simple and low cost, serious non-linear distortion occurs at an input current to greatly increase the low frequency harmonics, thereby decreasing the power factor. The power factor is defined as a ratio of the working power to the apparent power, and is an indicator for measuring the power utilization efficiency. Electronic devices with low power factor not only waste energy, but also generate enormous harmonics to adversely affect the stability of the power system and thus cause problems to the power generator, thereby seriously affecting the quality of power supply.

In general, the power factor of the power converter may be improved by adding a power factor correction (PFC) circuit to the power converter. However, the newly developed electronic devices are required to meet more severe total harmonic distortion (THD) requirement, and the structure of traditional PFC circuit is difficult to satisfy the specification requirements of the newly developed electronic devices.

SUMMARY

An example embodiment of a power factor correction (PFC) circuit of a flyback power converter is disclosed. The flyback power converter comprises a primary side coil, a secondary side coil, an inductive coil, and a power switch, wherein a first terminal of the primary side coil is coupled with an input voltage signal, a first terminal of the secondary side coil is coupled with an output voltage signal, the inductive coil is configured to operably sense the primary side coil to generate an inductive signal, and the power switch is coupled between a second terminal of the primary side coil and a fixed-voltage terminal. The PFC circuit comprises: a zero current detection circuit configured to operably detect the inductive signal when coupling with the inductive coil to generate a detection signal; an error detection circuit configured to operably generate an error signal corresponding to the output voltage signal or an output current signal of the flyback power converter according to a reference signal; a ramp signal generating circuit configured to operably generate a ramp signal; a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a control signal for controlling the power switch according to the detection signal and the comparison signal, and configured to operably control the ramp signal generating circuit to adjust a slope of the ramp signal.

Another example embodiment of a PFC circuit of a flyback power converter is disclosed. The flyback power converter comprises a primary side coil, a secondary side coil, and an inductive coil, wherein a first terminal of the primary side coil is coupled with an input voltage signal, a first terminal of the secondary side coil is coupled with an output voltage signal, and the inductive coil is configured to operably sense the primary side coil to generate an inductive signal. The PFC circuit comprises: a power switch is coupled between a second terminal of the primary side coil and a fixed-voltage terminal; a zero current detection circuit configured to operably detect the inductive signal when coupling with the inductive coil to generate a detection signal; an error detection circuit configured to operably generate an error signal corresponding to the output voltage signal or an output current signal of the flyback power converter according to a reference signal; a ramp signal generating circuit configured to operably generate a ramp signal; a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a control signal for controlling the power switch according to the detection signal and the comparison signal, and configured to operably control the ramp signal generating circuit to adjust a slope of the ramp signal.

Another example embodiment of a PFC circuit of an asynchronous-type buck-boost power converter is disclosed. The asynchronous-type buck-boost power converter comprises a first coil, an inductive coil, a power switch, and a diode, wherein a first terminal of the first coil is coupled with an input voltage signal, the inductive coil is configured to operably sense the first coil to provide an inductive signal, the power switch is coupled between a second terminal of the first coil and a fixed-voltage terminal, and the diode is coupled between the second terminal of the first coil and a load of the asynchronous-type buck-boost power converter. The PFC circuit comprises: a zero current detection circuit configured to operably detect the inductive signal when coupling with the inductive coil to generate a detection signal; an error detection circuit configured to operably generate an error signal corresponding to the output voltage signal or an output current signal of the asynchronous-type buck-boost power converter according to a reference signal; a ramp signal generating circuit configured to operably generate a ramp signal; a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a control signal for controlling the power switch according to the detection signal and the comparison signal, and configured to operably control the ramp signal generating circuit to adjust a slope of the ramp signal.

Another example embodiment of a PFC circuit of an asynchronous-type buck-boost power converter is disclosed. The asynchronous-type buck-boost power converter comprises a first coil, an inductive coil, and a diode, wherein a first terminal of the first coil is coupled with an input voltage signal, the inductive coil is configured to operably sense the first coil to provide an inductive signal, and the diode is coupled between a second terminal of the first coil and a load of the asynchronous-type buck-boost power converter. The PFC circuit comprises: a power switch is coupled between the second terminal of the first coil and a fixed-voltage terminal; a zero current detection circuit configured to operably detect the inductive signal when coupling with the inductive coil to generate a detection signal; an error detection circuit configured to operably generate an error signal corresponding to the output voltage signal or an output current signal of the asynchronous-type buck-boost power converter according to a reference signal; a ramp signal generating circuit configured to operably generate a ramp signal; a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a control signal for controlling the power switch according to the detection signal and the comparison signal, and configured to operably control the ramp signal generating circuit to adjust a slope of the ramp signal.

Another example embodiment of a PFC circuit of a synchronous-type buck-boost power converter is disclosed. The synchronous-type buck-boost power converter comprises a first coil, an inductive coil, a first power switch, and a second power switch, wherein a first terminal of the first coil is coupled with an input voltage signal, the inductive coil is configured to operably sense the first coil to provide an inductive signal, the first power switch is coupled between a second terminal of the first coil and a fixed-voltage terminal, and the second power switch is coupled between the second terminal of the first coil and a load of the synchronous-type buck-boost power converter. The PFC circuit comprises: a zero current detection circuit configured to operably detect the inductive signal when coupling with the inductive coil to generate a detection signal; an error detection circuit configured to operably generate an error signal corresponding to the output voltage signal or an output current signal of the synchronous-type buck-boost power converter according to a reference signal; a ramp signal generating circuit configured to operably generate a ramp signal; a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a first control signal for controlling the first power switch and a second control signal for controlling the second power switch according to the detection signal and the comparison signal, and configured to operably control the ramp signal generating circuit to adjust a slope of the ramp signal.

Another example embodiment of a PFC circuit of a synchronous-type buck-boost power converter is disclosed. The synchronous-type buck-boost power converter comprises a first coil and an inductive coil, wherein a first terminal of the first coil is coupled with an input voltage signal, and the inductive coil is configured to operably sense the first coil to provide an inductive signal. The PFC circuit comprises: a first power switch coupled between a second terminal of the first coil and a fixed-voltage terminal; a second power switch coupled between the second terminal of the first coil and a load of the synchronous-type buck-boost power converter; a zero current detection circuit configured to operably detect the inductive signal when coupling with the inductive coil to generate a detection signal; an error detection circuit configured to operably generate an error signal corresponding to the output voltage signal or an output current signal of the synchronous-type buck-boost power converter according to a reference signal; a ramp signal generating circuit configured to operably generate a ramp signal; a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a first control signal for controlling the first power switch and a second control signal for controlling the second power switch according to the detection signal and the comparison signal, and configured to operably control the ramp signal generating circuit to adjust a slope of the ramp signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
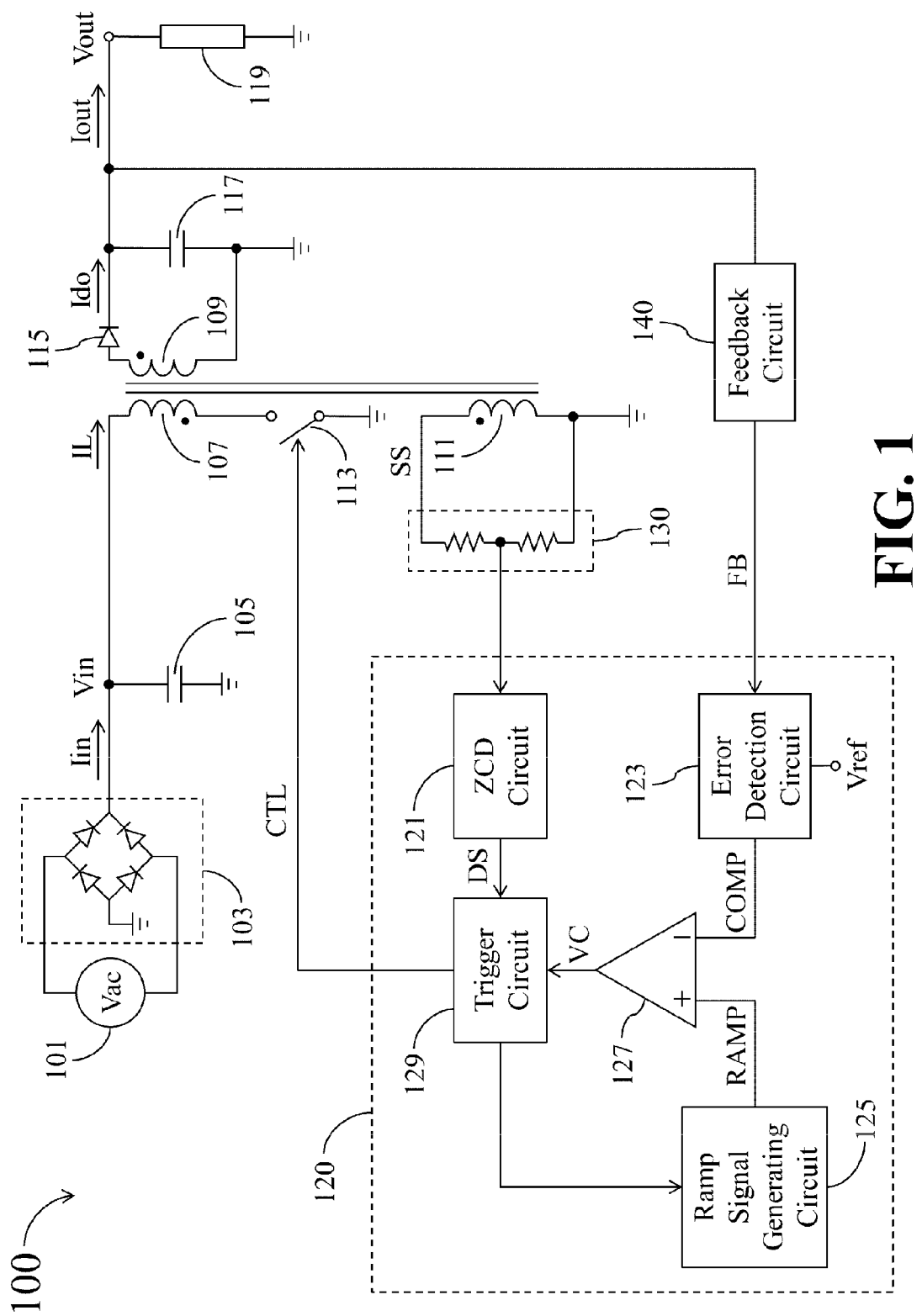
FIG. 1 shows a simplified functional block diagram of a flyback power converter according to one embodiment of the present disclosure.

FIG. 1 shows a simplified functional block diagram of a flyback power converter 100 according to one embodiment of the present disclosure. The power converter 100 is utilized for converting an AC voltage signal Vac provided by an AC power source 101 into a DC output voltage signal Vout, so that the output voltage signal Vout can be utilized by a load 119 in the subsequent stage. In this embodiment, the power converter 100 comprises a rectifier 103, an input capacitor 105, a primary side coil 107, a secondary side coil 109, an inductive coil 111, a power switch 113, a diode 115, an output capacitor 117, a power factor correction (PFC) circuit 120, a resistance device 130, and a feedback circuit 140.

The rectifier 103 is configured to operably rectify the AC voltage signal Vac provided from the AC power source 101 into an input voltage signal Vin having m-shape waveform. The input capacitor 105 is coupled with an output terminal of the rectifier 103 and configured to operably reduce the noise in the input voltage signal Vin. A first terminal of the primary side coil 107 is coupled with the input voltage signal Vin. A first terminal of the secondary side coil 109 is utilized for providing the output voltage signal Vout. The inductive coil 111 is configured to operably sense the primary side coil 107 to provide an inductive signal SS. The power switch 113 is coupled between a second terminal of the primary side coil 107 and a fixed-voltage terminal (such as a ground terminal). An input terminal of the diode 115 is coupled with the first terminal of the secondary side coil 109, and an output terminal of the diode 115 is coupled with the load 119 of the power converter 100. The output capacitor 117 is coupled with the output terminal of the diode 115 and configured to operably reduce the noise in the output voltage signal Vout. The PFC circuit 120 is configured to operably control the switching operations of the power switch 113 to adjust a current IL flowing through the primary side coil 107 to thereby change the magnitude of a current Ido flowing through the diode 115 so as to adjust the output voltage signal Vout. The resistance device 130 may conduct a voltage-dividing operation on the inductive signal SS. The feedback circuit 140 is configured to operably generate a corresponding feedback signal FB according to the output voltage signal Vout or the output current signal Iout of the power converter 100.

As shown in FIG. 1, the PFC circuit 120 comprises a zero current detection (ZCD) circuit 121, an error detection circuit 123, a ramp signal generating circuit 125, a comparison circuit 127, and a trigger circuit 129. In the embodiment of FIG. 1, the zero current detection circuit 121 is configured to operably detect the inductive signal SS when coupling with the inductive coil 111 to generate a detection signal DS. The error detection circuit 123 is configured to operably generate an error signal COMP corresponding to the output voltage signal Vout according to a reference signal Vref. The ramp signal generating circuit 125 is configured to operably generate a ramp signal RAMP. The comparison circuit 127 is coupled with the error detection circuit 123 and the ramp signal generating circuit 125, and configured to operably compare the ramp signal RAMP with the error signal COMP to generate a comparison signal VC. The trigger circuit 129 is coupled with the zero current detection circuit 121, the ramp signal generating circuit 125, and the comparison circuit 127. The trigger circuit 129 is configured to operably generate a control signal CTL for controlling the power switch 113 according to the detection signal DS and the comparison signal VC, and also configured to operably control the ramp signal generating circuit 125 to adjust a slope of the ramp signal RAMP.

In practice, the zero current detection circuit 121 may detect a voltage-divided generated by the resistance device 130 to generate the aforementioned detection signal DS. The error detection circuit 123 may generate the error signal COMP corresponding to the output voltage signal Vout according to the feedback signal FB generated by the feedback circuit 140 and the reference signal Vref.

Figure 2:
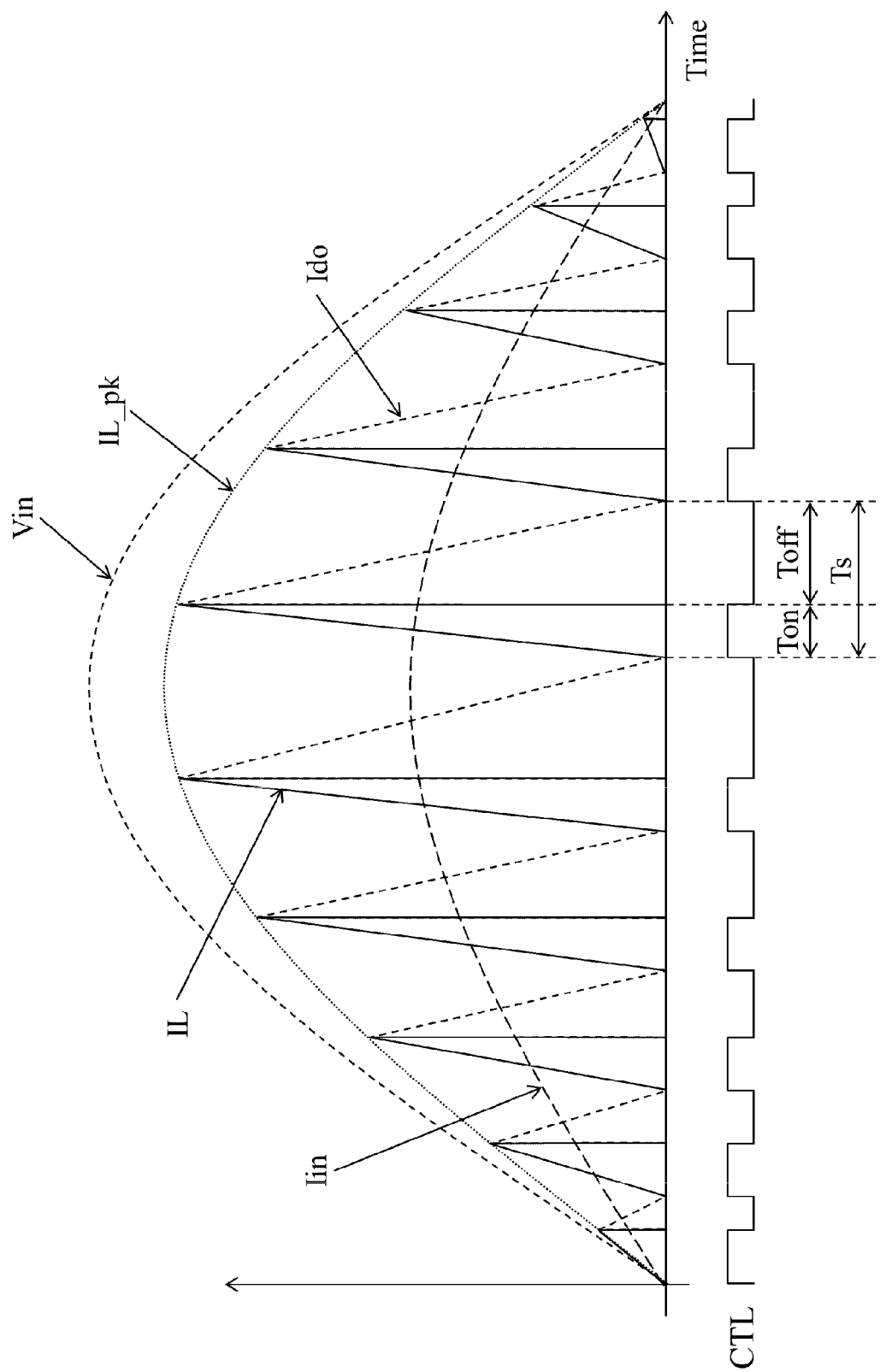
FIG. 2 shows a simplified schematic diagram of the relationship between an input voltage signal and an input current signal of the flyback power converter of FIG. 1 according to one embodiment of the present disclosure.

FIG. 2 shows a simplified schematic diagram of the relationship between the input voltage signal Vin and the input current signal Iin of the flyback power converter 100 of FIG. 1 according to one embodiment of the present disclosure. For the purpose of explanatory convenience in the following description, it is assumed herein that the control signal CTL in the embodiment of FIG. 2 is an active high signal. That is, the power switch 113 would be turned on when the PFC circuit 120 configures the control signal CTL to an active level.

In FIG. 2, IL_pk denotes an envelope of peak values of the current flowing through the primary side coil 107, Ton denotes the on time at which the power switch 113 is turned on in each switching cycle, Toff denotes the off time at which the power switch 113 is turned off in each switching cycle, Ts denotes a total time length of the on time Ton and the off time Toff of the power switch 113. That is, Ts represents the time length of each switch cycle of the power switch 113, and is also equivalent to the period length of the control signal CTL.

When the power switch 113 is turned on, the current flows to the power switch 113 through the primary side coil 107, so that the energy of the input voltage signal Vin received by the primary side coil 107 is passed to the secondary side coil 109 through the inductive effect to generate the current Ido flowing through the diode 115 when the power switch 113 is turned off. In this situation, the current Ido charges the output capacitor 117 to rise up the output voltage signal Vout.

The PFC circuit 120 controls the magnitude of the current IL by switching the power switch 113 at a high frequency, and the high frequency component in the current IL is filtered out by the input capacitor 105, so that the magnitude of the input current signal Iin becomes the average of the current IL. Accordingly, the PFC circuit 120 makes the waveform of the input current signal Iin to follow the waveform of the input voltage signal Vin by controlling the magnitude of the current IL, so that the waveform of the input current signal Iin approaches to the sine waveform to thereby increase the power factor while effectively reducing the total harmonic distortion (THD).

Figure 3:
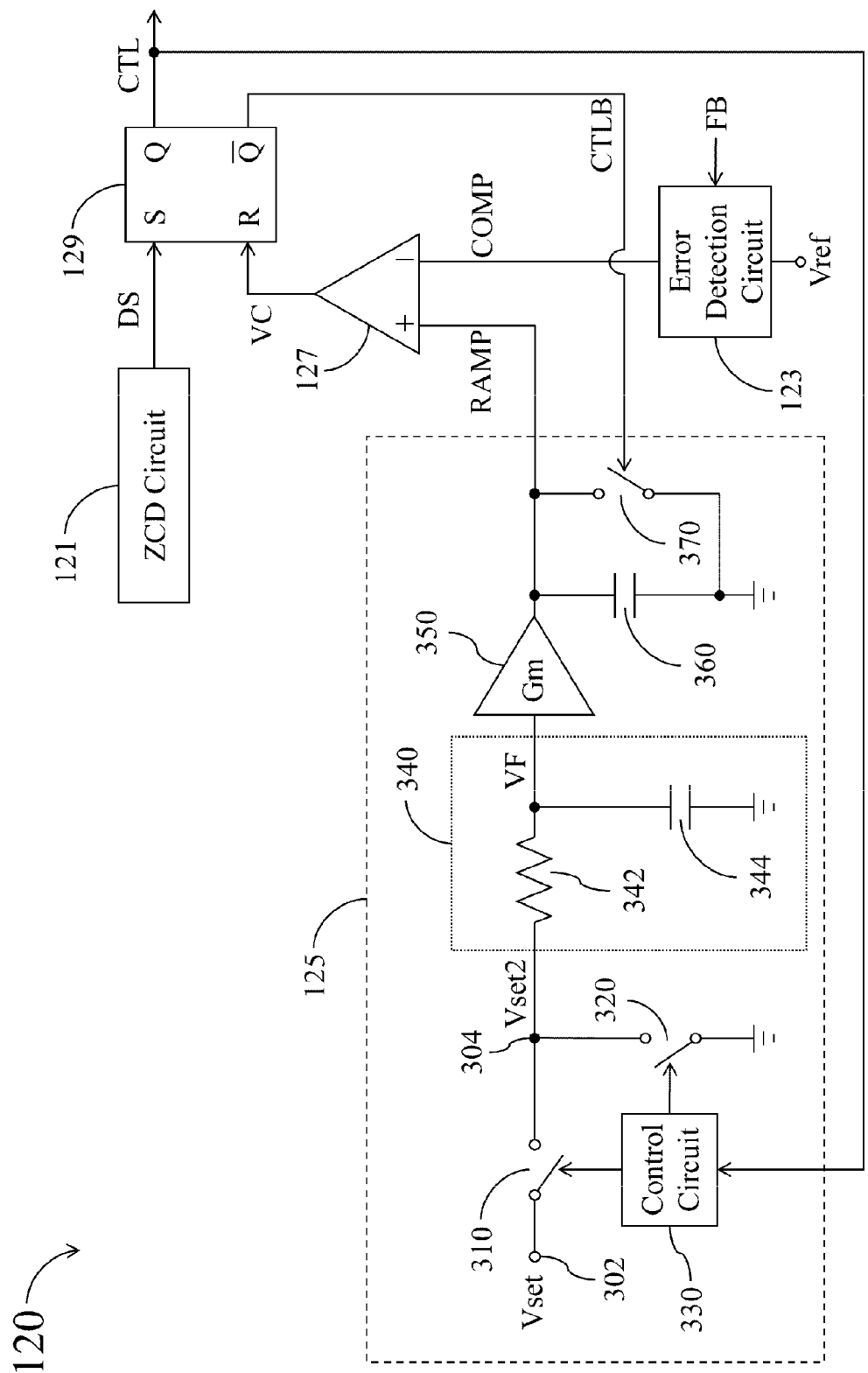
FIG. 3 shows a simplified functional block diagram of a power factor correction (PFC) circuit in FIG. 1 according to one embodiment of the present disclosure.

FIG. 3 shows a simplified functional block diagram of the PFC circuit 120 in FIG. 1 according to one embodiment of the present disclosure. As shown in FIG. 3, the ramp signal generating circuit 125 of the PFC circuit 120 comprises a first switch 310, a second switch 320, a control circuit 330, a low-pass filter 340, a transconductance amplifier 350, a capacitor 360, and a third switch 370. The first switch 310 is coupled between a setting signal input terminal 302 and a node 304, wherein the setting signal input terminal 302 is utilized for receiving a setting voltage Vset. The second switch 320 is coupled between the node 304 and a fixed-voltage terminal (such as a ground terminal). The control circuit 330 is coupled with a control terminal of the first switch 310 and a control terminal of the second switch 320. The control circuit 330 is configured to operably switch the first switch 310 and the second switch 320 alternatively under control of the trigger circuit 129, so as to render the node 304 to provide an adjusted voltage Vset2 less than the setting voltage Vset. The low-pass filter 340 comprises resistor 342 and a capacitor 344, and is coupled with the node 304. The low-pass filter 340 is configured to operably perform a low-pass filtering operation on the adjusted voltage Vset2 to generate a filtered signal VF. The transconductance amplifier 350 is coupled with the low-pass filter 340 and configured to operably convert the filtered signal VF into the ramp signal RAMP. The capacitor 360 is coupled with an output terminal of the transconductance amplifier 350. The third switch 370 is coupled between the output terminal of the transconductance amplifier 350 and a fixed-voltage terminal (such as a ground terminal), and a control terminal of the third switch 370 is coupled with an output terminal of the trigger circuit 129.

In practice, the trigger circuit 129 may be realized with a variety of flip-flop structures. In the embodiment of FIG. 3, for example, the trigger circuit 129 of the PFC circuit 120 is realized with a RS flip-flop. As shown in FIG. 3, the RS flip-flop comprises a set terminal, a reset terminal, a non-inverted output terminal, and an inverted output terminal. The set terminal is coupled with the zero current detection circuit 121. The reset terminal is coupled with the comparison circuit 127. The non-inverted output terminal is utilized for providing the control signal CTL. The inverted output terminal is coupled with the third switch 370 of the ramp signal generating circuit 125. In this embodiment, the non-inverted output terminal of the RS flip-flop is further coupled with the control circuit 330 of the ramp signal generating circuit 125.

Each time the zero current detection circuit 121 has detected that a zero current event occurs, e.g., when the inductive signal SS is less than a predetermined threshold, the zero current detection circuit 121 switches the detection signal DS to an active level (e.g., the high level in this embodiment) to configure the set terminal of the trigger circuit 129, so that the trigger circuit 129 configures the control signal CTL to the active level (e.g., the high level in this embodiment) to turn on the power switch 113. Meanwhile, the trigger circuit 129 configures the inverted signal CTLB outputted at the inverted output terminal to an inactive level (e.g., the low level in this embodiment), so as to turn off the third switch 370 of the ramp signal generating circuit 125.

Each time the power switch 113 is turned on, the current IL gradually rises up from zero. Meanwhile, the level of the ramp signal RAMP generated by the ramp signal generating circuit 125 also gradually rises up with a predetermined slope. When the comparison circuit 127 detects that the ramp signal RAMP is greater than or equal to the error signal COMP, the comparison circuit 127 configures the reset terminal of the trigger circuit 129 to the active level (e.g., the high level in this embodiment), so as to transit the control signal CTL to the inactive level (e.g., the low level in this embodiment) to thereby turn off the power switch 113. Meanwhile, the inverted signal CTLB outputted at the inverted output terminal of the trigger circuit 129 transits to the active level (e.g., the high level in this embodiment) to turn on the third switch 370 of the ramp signal generating circuit 125, so that the level of the ramp signal RAMP drops down rapidly. When the zero current detection circuit 121 afterwards detects that another zero current event occurs, the trigger circuit 129 switches the control signal CTL to the active level to turn on the power switch 113 again.

According to the foregoing descriptions, the on time Ton of the power switch 113 is determined by the slope of the ramp signal RAMP, and could be represented as below:

$$Ton=(Cramp*Vcomp)/[Vset2*Gm]\qquad \text{Formula (1)}$$

wherein Cramp denotes the capacitance value of the capacitor 360 of the ramp signal generating circuit 125, Vcomp denotes the voltage value of the error signal COMP generated by the error detection circuit 123, and Gm denotes the transconductance value of the transconductance amplifier 350.

In the embodiment of FIG. 3, the control circuit 330 alternatively switches the first switch 310 and the second switch 320 according to the control signal CTL, so that the first switch 310 and the second switch 320 are alternatively turned on to change the slope of the ramp signal RAMP outputted from the ramp signal generating circuit 125. Specifically, the control circuit 330 may turn on the first switch 310 and turn off the second switch 320 when the control signal CTL is at the active level, the control circuit 330 may turn off the first switch 310 and turn on the second switch 320 when the control signal CTL is at the inactive level. Accordingly, the magnitude of the adjusted voltage Vset2 on the node 304 could be represented as below:

$$Vset2=Vset*(Ton/Ts)\qquad \text{Formula (2)}$$

The following Formula (3) could be obtained by substituting the Formula (2) into the Formula (1):

$$Ton=(Cramp*Vcomp)/[Vset*(Ton/Ts)*Gm]\qquad \text{Formula (3)}$$

Since the values of Cramp, Vcomp, Vset, and Gm are substantially fixed, it can be appreciated from the Formula (3) that the on time Ton of the power switching 113 is proportional to the item (Ts/Ton).

In addition, assuming that the inductance value of the primary side coil 107 is L, then the average value of the input current signal Iin in each switching cycle of the power switch 113 could be represented as below:

$$Iin=(½)*(Vin/L)*Ton*(Ton/Ts)\qquad \text{Formula (4)}$$

Since L is substantially a fixed value and Ton is proportional to the item (Ts/Ton), it can be appreciated from the Formula (4) that the waveform of the input current signal Iin would completely follow the change of the waveform of the input voltage signal Vin, and thus there is no phase difference between the input current signal Iin and the waveform of the input voltage signal Vin.

In other words, the way that the trigger circuit 129 controls the ramp signal generating circuit 125 to adjust the slope of the ramp signal RAMP renders the waveform of the input current signal Iin of the power converter 100 to completely follow the waveform of the input voltage signal Vin. Accordingly, with the operations of the disclosed PFC circuit 120, the input current signal Iin and the input voltage signal Vin are enabled to have the same phase, and the input current signal Iin is enabled to have a waveform approaching to the sine waveform. As a result, the total harmonic distortion can be effectively reduced while improving the power factor of the power converter 100.

In the previous embodiments, the feedback circuit 140 generates the feedback signal FB directly based on the output voltage signal Vout or the output current signal Iout of the power converter 100. But this is merely an exemplary embodiment, rather than a restriction to the practical implementations. In practice, the feedback circuit 140 may be instead designed to generate the feedback signal FB corresponding to the output current signal Iout of the power converter 100 according to the detection signal DS outputted from the zero current detection circuit 121 or the current flowing through the power switch 113.

In previous embodiments, the control circuit 330 of the ramp signal generating circuit 125 controls the switching operations of the first switch 310 and the second switch 320 according to the signal outputted from the non-inverted output terminal of the trigger circuit 129. But this is merely an exemplary embodiment, rather than a restriction to the practical implementations. In practice, the inverted output terminal of the trigger circuit 129 in FIG. 3 may be instead coupled with the control circuit 330 and the logic combinations inside the control circuit 330 may be adjusted, so as to render the control circuit 330 to change the slope of the ramp signal RAMP outputted from the ramp signal generating circuit 125 by controlling the switching operations of the first switch 310 and the second switch 320 according to the inverted signal CTLB outputted from the inverted output terminal of the trigger circuit 129. For example, the control circuit 330 may be instead designed to turn on the first switch 310 and turn off the second switch 320 when the inverted signal CTLB is at the inactive level, and instead designed to turn off the first switch 310 and turn on the second switch 320 when the inverted signal CTLB is at the active level.

In addition, when the first switch 310 and the second switch 320 of the ramp signal generating circuit 125 are instead realized with switch components of opposing control logics, the inverted output terminal of the trigger circuit 129 in FIG. 3 may be instead coupled with the control circuit 330, so that the control circuit 330 controls the switching operations of the first switch 310 and the second switch 320 according to the inverted signal CTLB outputted from the inverted output terminal of the trigger circuit 129. In this situation, the control circuit 330 may be instead designed to turn on the first switch 310 and turn off the second switch 320 when the inverted signal CTLB is at the active level, and instead designed to turn off the first switch 310 and turn on the second switch 320 when the inverted signal CTLB is at the inactive level.

Similarly, when the third switch 370 in the ramp signal generating circuit 125 is instead realized with a switch component of opposing control logic, the non-inverted output terminal of the trigger circuit 129 in FIG. 3 may be instead coupled with the control terminal of the third switch 370, so that the third switch 370 switches according to the control signal CTL outputted from the non-inverted output terminal of the trigger circuit 129.

Similarly, when the power switch 113 is instead realized with a switch component of opposing control logic, the inverted output terminal of the trigger circuit 129 in FIG. 3 may be instead coupled with the control terminal of the power switch 113, and the inverted signal CTLB outputted from the inverted output terminal may be instead employed as the control signal for controlling the power switch 113.

Different functional blocks in the power converter 100 may be respectively realized with different circuits, or may be integrated into a single circuit chip. For example, all functional blocks in the PFC circuit 120 may be integrated in a single controller IC. The power switch 113 may be further integrated into the PFC circuit 120 to form a single controller IC. In addition, the resistance device 130 and/or the feedback circuit 140 may be further integrated into the PFC circuit 120.

Figure 4:
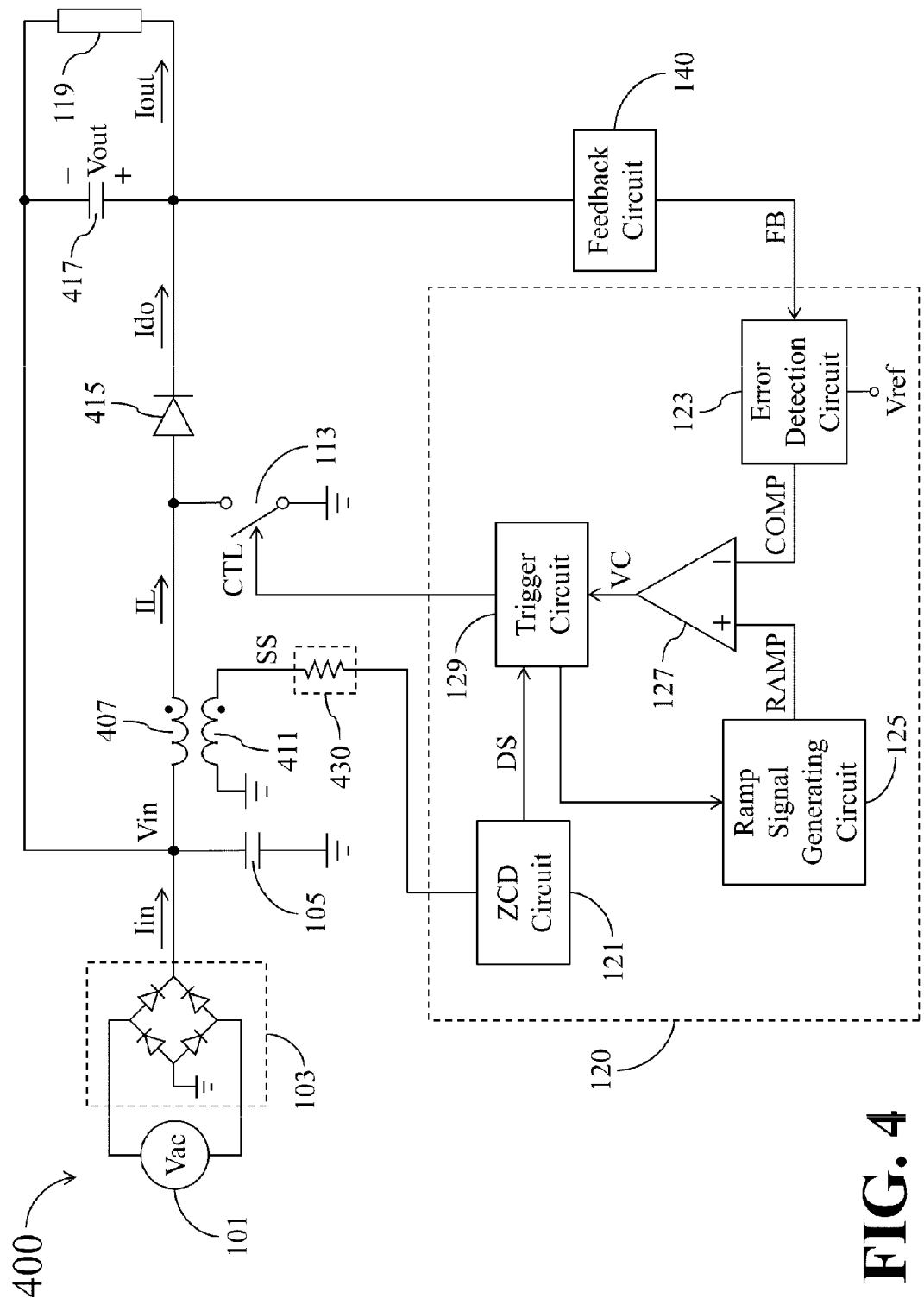
FIG. 4 shows a simplified functional block diagram of an asynchronous-type buck-boost power converter according to one embodiment of the present disclosure.
Figure 5:
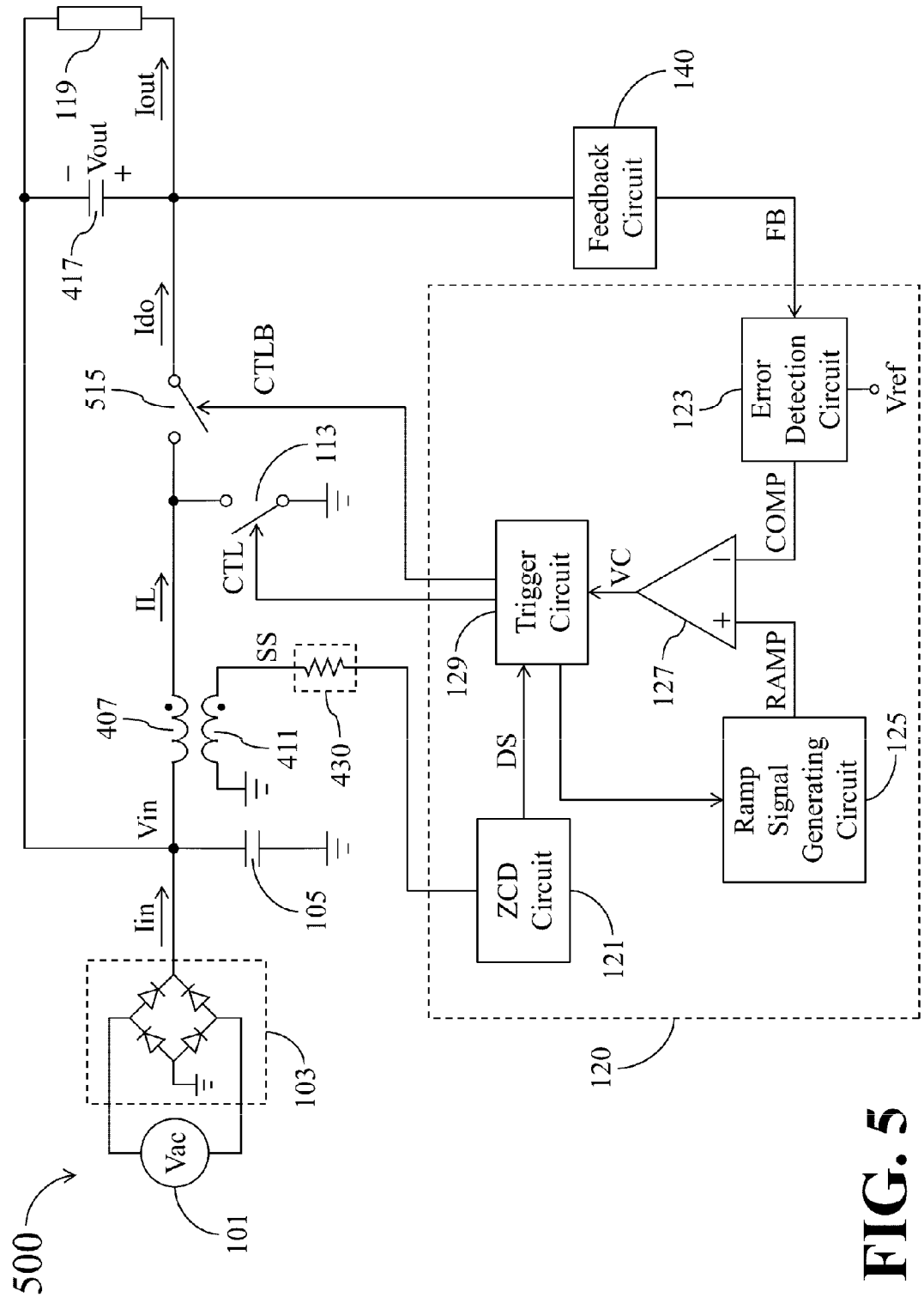
FIG. 5 shows a simplified functional block diagram of a synchronous-type buck-boost power converter according to one embodiment of the present disclosure.

In practical applications, the structure of the disclosed PFC circuit 120 is also applicable to other power converters having different structures. For example, FIG. 4 shows a simplified functional block diagram of an asynchronous-type buck-boost power converter 400 adopting the aforementioned PFC circuit 120 according to one embodiment of the present disclosure. FIG. 5 shows a simplified functional block diagram of a synchronous-type buck-boost power converter 500 adopting the aforementioned PFC circuit 120 according to one embodiment of the present disclosure.

As shown in FIG. 4, the power converter 400 comprises the rectifier 103, the input capacitor 105, a first coil 407, an inductive coil 411, the power switch 113, a diode 415, an output capacitor 417, the PFC circuit 120, a resistance device 430, and a feedback circuit 140. A first terminal of the first coil 407 is coupled with the input voltage signal Vin. The power switch 113 is coupled between a second terminal of the first coil 407 and a fixed-voltage terminal (such as a ground terminal). The diode 415 is coupled between the second terminal of the first coil 407 and the load 119 of the asynchronous-type buck-boost power converter 400. The inductive coil 411 is configured to operably sense the first coil 407 to provide an inductive signal SS. The output capacitor 117 is coupled between the output terminal of the diode 115 and the first terminal of the first coil 407, and configured to operably reduce the noise in the output voltage signal Vout.

In the embodiment of FIG. 4, the zero current detection circuit 121 of the PFC circuit 120 is configured to operable detect the inductive signal SS when coupling with the inductive coil 411 to generate the detection signal DS. The PFC circuit 120 may control the magnitude of the current IL flowing through the first coil 407 by controlling the switching operations of the power switch 113 with the manner described previously to render the waveform of the input current signal Iin to follow the waveform of the input voltage signal Vin, so that the waveform of the input current signal Iin approaches to the sine waveform to thereby increase the power factor while effectively reducing the total harmonic distortion.

The descriptions regarding the operations, implementations, varieties, and related advantages of other corresponding functional blocks in the foregoing FIG. 1 and FIG. 3 are also applicable to the embodiment of FIG. 4. For the sake of brevity, those descriptions will not be repeated here.

In the embodiment of FIG. 4, the feedback circuit 140, the diode 415, and/or the resistance device 430 may be instead integrated into the PFC circuit 120.

As shown in FIG. 5, the power converter 500 comprises the rectifier 103, the input capacitor 105, the first coil 407, the first power switch 113, a second power switch 515, the output capacitor 417, the PFC circuit 120, the resistance device 430, and the feedback circuit 140. A first terminal of the first coil 407 is coupled with the input voltage signal Vin. The first power switch 113 is coupled between a second terminal of the first coil 407 and a fixed-voltage terminal (such as a ground terminal). The second power switch 515 is coupled between the second terminal of the first coil 407 and the load 119 of the synchronous-type buck-boost power converter 500.

In the embodiment of FIG. 5, the PFC circuit 120 may also utilize the control signal CTL outputted from the trigger circuit 129 as a first control signal for controlling one of the first power switch 113 and the second power switch 515, while utilize the inverted signal CTLB outputted from the trigger circuit 129 as a second control signal for controlling another power switch. The PFC circuit 120 may control the magnitude of the current IL flowing through the first coil 407 by controlling the switching operations of the first power switch 113 and the second power switch 515 with the manner described previously to render the waveform of the input current signal Iin to follow the waveform of the input voltage signal Vin, so that the waveform of the input current signal Iin approaches to the sine waveform to thereby increase the power factor while effectively reducing the total harmonic distortion.

The descriptions regarding the operations, implementations, varieties, and related advantages of other corresponding functional blocks in the foregoing FIG. 1, FIG. 3, and FIG. 4 are also applicable to the embodiment of FIG. 5. For the sake of brevity, those descriptions will not be repeated here.

In the embodiment of FIG. 5, the first power switch 113, the second power switch 515, the feedback circuit 140, and/or the resistance device 430 may be integrated into the PFC circuit 120.

As can be appreciated from the foregoing elaborations that the disclosed PFC circuit 120 effectively reduces the total harmonic distortion and increases the power factor. Furthermore, the proposed PFC circuit 120 has a very compact circuitry structure and could be applied in many power converters of different structures, so the PFC circuit 120 has high application flexibility and a very wide application scope.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The term "voltage signal" used throughout the description and the claims may be expressed in the format of a current in implementations, and the term "current signal" used throughout the description and the claims may be expressed in the format of a voltage in implementations.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A power factor correction circuit of a flyback power converter, the flyback power converter comprising a primary side coil, a secondary side coil, an inductive coil, and a power switch, wherein a first terminal of the primary side coil is coupled with an input voltage signal, a first terminal of the secondary side coil is coupled with an output voltage signal, the inductive coil is configured to operably sense the primary side coil to generate an inductive signal, and the power switch is coupled between a second terminal of the primary side coil and a fixed-voltage terminal, the PFC circuit comprising:

a zero current detection circuit configured to operably detect the inductive signal when coupling with the inductive coil to generate a detection signal;

an error detection circuit configured to operably generate an error signal corresponding to the output voltage signal or an output current signal of the flyback power converter according to a reference signal;

a ramp signal generating circuit configured to operably generate a ramp signal;

a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a control signal for controlling the power switch according to the detection signal and the comparison signal, and configured to operably control the ramp signal generating circuit to adjust a slope of the ramp signal;

wherein the ramp signal generating circuit comprises:

a first switch coupled between a setting signal input terminal and a node, wherein the setting signal input terminal is utilized for receiving a setting voltage;

a second switch coupled between the node and a fixed-voltage terminal;

a control circuit coupled with a control terminal of the first switch and a control terminal of the second switch, and configured to operably switch the first switch and the second switch alternatively under control of the trigger circuit, so as to render the node to provide an adjusted voltage less than the setting voltage;

a low-pass filter coupled with the node and configured to operably perform a low-pass filtering operation on the adjusted voltage to generate a filtered signal;

a transconductance amplifier coupled with the low-pass filter and configured to operably convert the filtered signal into the ramp signal;

a capacitor coupled with an output terminal of the transconductance amplifier; and a third switch coupled between the output terminal of the transconductance amplifier and a fixed-voltage terminal, wherein a control terminal of the third switch is coupled with the trigger circuit.

2. The PFC circuit of claim 1, wherein the trigger circuit comprises:

a RS flip-flop comprising a set terminal, a reset terminal, a non-inverted output terminal, and an inverted output terminal, wherein the set terminal is coupled with the zero current detection circuit, and the reset terminal is coupled with the comparison circuit;

wherein one of the non-inverted output terminal and the inverted output terminal is coupled with a control terminal of the power switch, one of the non-inverted output terminal and the inverted output terminal is coupled with the control circuit, and one of the non-inverted output terminal and the inverted output terminal is coupled with the control terminal of the third switch.

3. A PFC circuit of a flyback power converter, the flyback power converter comprising a primary side coil, a secondary side coil, and an inductive coil, wherein a first terminal of the primary side coil is coupled with an input voltage signal, a first terminal of the secondary side coil is coupled with an output voltage signal, and the inductive coil is configured to operably sense the primary side coil to generate an inductive signal, the PFC circuit comprising:

a power switch is coupled between a second terminal of the primary side coil and a fixed-voltage terminal;

a zero current detection circuit configured to operably detect the inductive signal when coupling with the inductive coil to generate a detection signal;

an error detection circuit configured to operably generate an error signal corresponding to the output voltage signal or an output current signal of the flyback power converter according to a reference signal;

a ramp signal generating circuit configured to operably generate a ramp signal;

a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a control signal for controlling the power switch according to the detection signal and the comparison signal, and configured to operably control the ramp signal generating circuit to adjust a slope of the ramp signal;

wherein the ramp signal generating circuit comprises:

a first switch coupled between a setting signal input terminal and a node, wherein the setting signal input terminal is utilized for receiving a setting voltage;

a second switch coupled between the node and a fixed-voltage terminal;

a control circuit coupled with a control terminal of the first switch and a control terminal of the second switch, and configured to operably switch the first switch and the second switch alternatively under control of the trigger circuit, so as to render the node to provide an adjusted voltage less than the setting voltage;

a low-pass filter coupled with the node and configured to operably perform a low-pass filtering operation on the adjusted voltage to generate a filtered signal;

a transconductance amplifier coupled with the low-pass filter and configured to operably convert the filtered signal into the ramp signal;

a capacitor coupled with an output terminal of the transconductance amplifier; and a third switch coupled between the output terminal of the transconductance amplifier and a fixed-voltage terminal, wherein a control terminal of the third switch is coupled with the trigger circuit.

4. The PFC circuit of claim 3, wherein the trigger circuit comprises:

a RS flip-flop comprising a set terminal, a reset terminal, a non-inverted output terminal, and an inverted output terminal, wherein the set terminal is coupled with the zero current detection circuit, and the reset terminal is coupled with the comparison circuit;

wherein one of the non-inverted output terminal and the inverted output terminal is coupled with a control terminal of the power switch, one of the non-inverted output terminal and the inverted output terminal is coupled with the control circuit, and one of the non-inverted output terminal and the inverted output terminal is coupled with the control terminal of the third switch.

5. A PFC circuit of an asynchronous-type buck-boost power converter, the asynchronous-type buck-boost power converter comprising a first coil, an inductive coil, a power switch, and a diode, wherein a first terminal of the first coil is coupled with an input voltage signal, the inductive coil is configured to operably sense the first coil to provide an inductive signal, the power switch is coupled between a second terminal of the first coil and a fixed-voltage terminal, and the diode is coupled between the second terminal of the first coil and a load of the asynchronous-type buck-boost power converter, the PFC circuit comprising:

a zero current detection circuit configured to operably detect the inductive signal when coupling with the inductive coil to generate a detection signal;

an error detection circuit configured to operably generate an error signal corresponding to an output voltage signal or an output current signal of the asynchronous-type buck-boost power converter according to a reference signal;

a ramp signal generating circuit configured to operably generate a ramp signal;

a comparison circuit coupled with the error detection circuit and the ramp signal generating circuit, and configured to operably compare the ramp signal with the error signal to generate a comparison signal; and a trigger circuit coupled with the zero current detection circuit, the ramp signal generating circuit, and the comparison circuit, and configured to operably generate a control signal for controlling the power switch according to the detection signal and the comparison signal, and configured to operably control the ramp signal generating circuit to adjust a slope of the ramp signal;

wherein the ramp signal generating circuit comprises:

a first switch coupled between a setting signal input terminal and a node, wherein the setting signal input terminal is utilized for receiving a setting voltage;

a second switch coupled between the node and a fixed-voltage terminal;

a control circuit coupled with a control terminal of the first switch and a control terminal of the second switch, and configured to operably switch the first switch and the second switch alternatively under control of the trigger circuit, so as to render the node to provide an adjusted voltage less than the setting voltage;

a low-pass filter coupled with the node and configured to operably perform a low-pass filtering operation on the adjusted voltage to generate a filtered signal;

a transconductance amplifier coupled with the low-pass filter and configured to operably convert the filtered signal into the ramp signal;

a capacitor coupled with an output terminal of the transconductance amplifier; and a third switch coupled between the output terminal of the transconductance amplifier and a fixed-voltage terminal, wherein a control terminal of the third switch is coupled with the trigger circuit.

6. The PFC circuit of claim 5, wherein the trigger circuit comprises:

a RS flip-flop comprising a set terminal, a reset terminal, a non-inverted output terminal, and an inverted output terminal, wherein the set terminal is coupled with the zero current detection circuit, and the reset terminal is coupled with the comparison circuit;

wherein one of the non-inverted output terminal and the inverted output terminal is coupled with a control terminal of the power switch, one of the non-inverted output terminal and the inverted output terminal is coupled with the control circuit, and one of the non-inverted output terminal and the inverted output terminal is coupled with the control terminal of the third switch.

7. A PFC circuit of an asynchronous-type buck-boost power converter, the asynchronous-type buck-boost power converter comprising a first coil, an inductive coil, and a diode, wherein a first terminal of the first coil is coupled with an input voltage signal, the inductive coil is configured to operably sense the first coil to provide an inductive signal, and the diode is coupled between a second terminal of the first coil and a load of the asynchronous-type buck-boost power converter, the PFC circuit comprising:

a power switch is coupled between the second terminal of the first coil and a fixed-voltage terminal;

a zero current detection circuit configured to operably detect the inductive signal when coupling with the inductive coil to generate a detection signal;

an error detection circuit configured to operably generate an error signal corresponding to an output voltage signal or an output current signal of the asynchronous-type buck-boost power converter according to a reference signal;
a ramp signal generating circuit configured to operably generate a ramp signal;
a comparison circuit coupled with the error detection circuit and the ramp signal generating circuit, and configured to operably compare the ramp signal with the error signal to generate a comparison signal; and
a trigger circuit coupled with the zero current detection circuit, the ramp signal generating circuit, and the comparison circuit, and configured to operably generate a control signal for controlling the power switch according to the detection signal and the comparison signal, and configured to operably control the ramp signal generating circuit to adjust a slope of the ramp signal;
wherein the ramp signal generating circuit comprises:
a first switch coupled between a setting signal input terminal and a node, wherein the setting signal input terminal is utilized for receiving a setting voltage;
a second switch coupled between the node and a fixed-voltage terminal;
a control circuit coupled with a control terminal of the first switch and a control terminal of the second switch, and configured to operably switch the first switch and the second switch alternatively under control of the trigger circuit, so as to render the node to provide an adjusted voltage less than the setting voltage;
a low-pass filter coupled with the node and configured to operably perform a low-pass filtering operation on the adjusted voltage to generate a filtered signal;
a transconductance amplifier coupled with the low-pass filter and configured to operably convert the filtered signal into the ramp signal;
a capacitor coupled with an output terminal of the transconductance amplifier; and
a third switch coupled between the output terminal of the transconductance amplifier and a fixed-voltage terminal, wherein a control terminal of the third switch is coupled with the trigger circuit.

8. The PFC circuit of claim 7, wherein the trigger circuit comprises:
a RS flip-flop comprising a set terminal, a reset terminal, a non-inverted output terminal, and an inverted output terminal, wherein the set terminal is coupled with the zero current detection circuit, and the reset terminal is coupled with the comparison circuit;
wherein one of the non-inverted output terminal and the inverted output terminal is coupled with a control terminal of the power switch, one of the non-inverted output terminal and the inverted output terminal is coupled with the control circuit, and one of the non-inverted output terminal and the inverted output terminal is coupled with the control terminal of the third switch.

9. A PFC circuit of a synchronous-type buck-boost power converter, the synchronous-type buck-boost power converter comprising a first coil, an inductive coil, a first power switch, and a second power switch, wherein a first terminal of the first coil is coupled with an input voltage signal, the inductive coil is configured to operably sense the first coil to provide an inductive signal, the first power switch is coupled between a second terminal of the first coil and a fixed-voltage terminal, and the second power switch is coupled between the second terminal of the first coil and a load of the synchronous-type buck-boost power converter, the PFC circuit comprising:
a zero current detection circuit configured to operably detect the inductive signal when coupling with the inductive coil to generate a detection signal;
an error detection circuit configured to operably generate an error signal corresponding to an output voltage signal or an output current signal of the synchronous-type buck-boost power converter according to a reference signal;
a ramp signal generating circuit configured to operably generate a ramp signal;
a comparison circuit coupled with the error detection circuit and the ramp signal generating circuit, and configured to operably compare the ramp signal with the error signal to generate a comparison signal; and
a trigger circuit coupled with the zero current detection circuit, the ramp signal generating circuit, and the comparison circuit, and configured to operably generate a first control signal for controlling the first power switch and a second control signal for controlling the second power switch according to the detection signal and the comparison signal, and configured to operably control the ramp signal generating circuit to adjust a slope of the ramp signal;
wherein the ramp signal generating circuit comprises:
a first switch coupled between a setting signal input terminal and a node, wherein the setting signal input terminal is utilized for receiving a setting voltage;
a second switch coupled between the node and a fixed-voltage terminal;
a control circuit coupled with a control terminal of the first switch and a control terminal of the second switch, and configured to operably switch the first switch and the second switch alternatively under control of the trigger circuit, so as to render the node to provide an adjusted voltage less than the setting voltage;
a low-pass filter coupled with the node and configured to operably perform a low-pass filtering operation on the adjusted voltage to generate a filtered signal;
a transconductance amplifier coupled with the low-pass filter and configured to operably convert the filtered signal into the ramp signal;
a capacitor coupled with an output terminal of the transconductance amplifier; and
a third switch coupled between the output terminal of the transconductance amplifier and a fixed-voltage terminal, wherein a control terminal of the third switch is coupled with the trigger circuit.

10. The PFC circuit of claim 9, wherein the trigger circuit comprises:
a RS flip-flop comprising a set terminal, a reset terminal, a non-inverted output terminal, and an inverted output terminal, wherein the set terminal is coupled with the zero current detection circuit, and the reset terminal is coupled with the comparison circuit;
wherein one of the non-inverted output terminal and the inverted output terminal is coupled with a control terminal of the first or second power switch, one of the non-inverted output terminal and the inverted output terminal is coupled with the control circuit, and one of the non-inverted output terminal and the inverted output terminal is coupled with the control terminal of the third switch.

11. A PFC circuit of a synchronous-type buck-boost power converter, the synchronous-type buck-boost power converter comprising a first coil and an inductive coil, wherein a first terminal of the first coil is coupled with an input voltage signal, and the inductive coil is configured to operably sense the first coil to provide an inductive signal, the PFC circuit comprising:
- a first power switch coupled between a second terminal of the first coil and a fixed-voltage terminal;
- a second power switch coupled between the second terminal of the first coil and a load of the synchronous-type buck-boost power converter;
- a zero current detection circuit configured to operably detect the inductive signal when coupling with the inductive coil to generate a detection signal;
- an error detection circuit configured to operably generate an error signal corresponding to an output voltage signal or an output current signal of the synchronous-type buck-boost power converter according to a reference signal;
- a ramp signal generating circuit configured to operably generate a ramp signal;
- a comparison circuit coupled with the error detection circuit and the ramp signal generating circuit, and configured to operably compare the ramp signal with the error signal to generate a comparison signal; and
- a trigger circuit coupled with the zero current detection circuit, the ramp signal generating circuit, and the comparison circuit, and configured to operably generate a first control signal for controlling the first power switch and a second control signal for controlling the second power switch according to the detection signal and the comparison signal, and configured to operably control the ramp signal generating circuit to adjust a slope of the ramp signal;
- wherein the ramp signal generating circuit comprises:
- a first switch coupled between a setting signal input terminal and a node, wherein the setting signal input terminal is utilized for receiving a setting voltage;
- a second switch coupled between the node and a fixed-voltage terminal;
- a control circuit coupled with a control terminal of the first switch and a control terminal of the second switch, and configured to operably switch the first switch and the second switch alternatively under control of the trigger circuit, so as to render the node to provide an adjusted voltage less than the setting voltage;
- a low-pass filter coupled with the node and configured to operably perform a low-pass filtering operation on the adjusted voltage to generate a filtered signal;
- a transconductance amplifier coupled with the low-pass filter and configured to operably convert the filtered signal into the ramp signal;
- a capacitor coupled with an output terminal of the transconductance amplifier; and
- a third switch coupled between the output terminal of the transconductance amplifier and a fixed-voltage terminal, wherein a control terminal of the third switch is coupled with the trigger circuit.

12. The PFC circuit of claim 11, wherein the trigger circuit comprises:
- a RS flip-flop comprising a set terminal, a reset terminal, a non-inverted output terminal, and an inverted output terminal, wherein the set terminal is coupled with the zero current detection circuit, and the reset terminal is coupled with the comparison circuit;
- wherein one of the non-inverted output terminal and the inverted output terminal is coupled with a control terminal of the first or second power switch, one of the non-inverted output terminal and the inverted output terminal is coupled with the control circuit, and one of the non-inverted output terminal and the inverted output terminal is coupled with the control terminal of the third switch.

* * * * *